US007626727B2

(12) United States Patent
Sugimori

(10) Patent No.: US 7,626,727 B2
(45) Date of Patent: Dec. 1, 2009

(54) IMAGE CAPTURING APPARATUS, IMAGE PROCESSING METHOD, PROGRAM, AND STORAGE MEDIUM

(75) Inventor: Masami Sugimori, Yamato (JP)

(73) Assignee: Canon Kabushiki Kaisha, Tokyo (JP)

( * ) Notice: Subject to any disclaimer, the term of this patent is extended or adjusted under 35 U.S.C. 154(b) by 455 days.

(21) Appl. No.: 11/606,210

(22) Filed: Nov. 30, 2006

(65) Prior Publication Data
US 2007/0127095 A1 Jun. 7, 2007

(30) Foreign Application Priority Data
Dec. 1, 2005 (JP) .............................. 2005-347931

(51) Int. Cl.
G06F 15/00 (2006.01)
(52) U.S. Cl. ..................... 358/1.9; 358/518; 358/426.13
(58) Field of Classification Search ................. 358/518, 358/1.9, 426.13
See application file for complete search history.

(56) References Cited
U.S. PATENT DOCUMENTS
5,267,333 A * 11/1993 Aono et al. ................. 382/166

2004/0119841 A1 6/2004 Shimizu
2007/0127095 A1 6/2007 Sugimori

FOREIGN PATENT DOCUMENTS
JP 2004128809 4/2004

* cited by examiner

Primary Examiner—Twyler L Haskins
Assistant Examiner—Michael Burleson
(74) Attorney, Agent, or Firm—Fitzpatrick, Cella, Harper & Scinto

(57) ABSTRACT

This invention reduces degradation in quality of a resized image in obtaining the resized image. An image capturing apparatus includes an image sensor which converts an optical image into an electrical signal, an A/D conversion unit which converts an image signal output from the image sensor into digital image data, a color interpolation unit which executes color interpolation of the digital image data, a separation unit which separates the digital image data that has undergone color interpolation by the color interpolation unit into a luminance component and color difference components, an image size conversion unit which converts the image size of the luminance component and color difference components, and a lossless compression unit which losslessly compresses the luminance component and color difference components generated by the image size conversion unit.

10 Claims, 9 Drawing Sheets

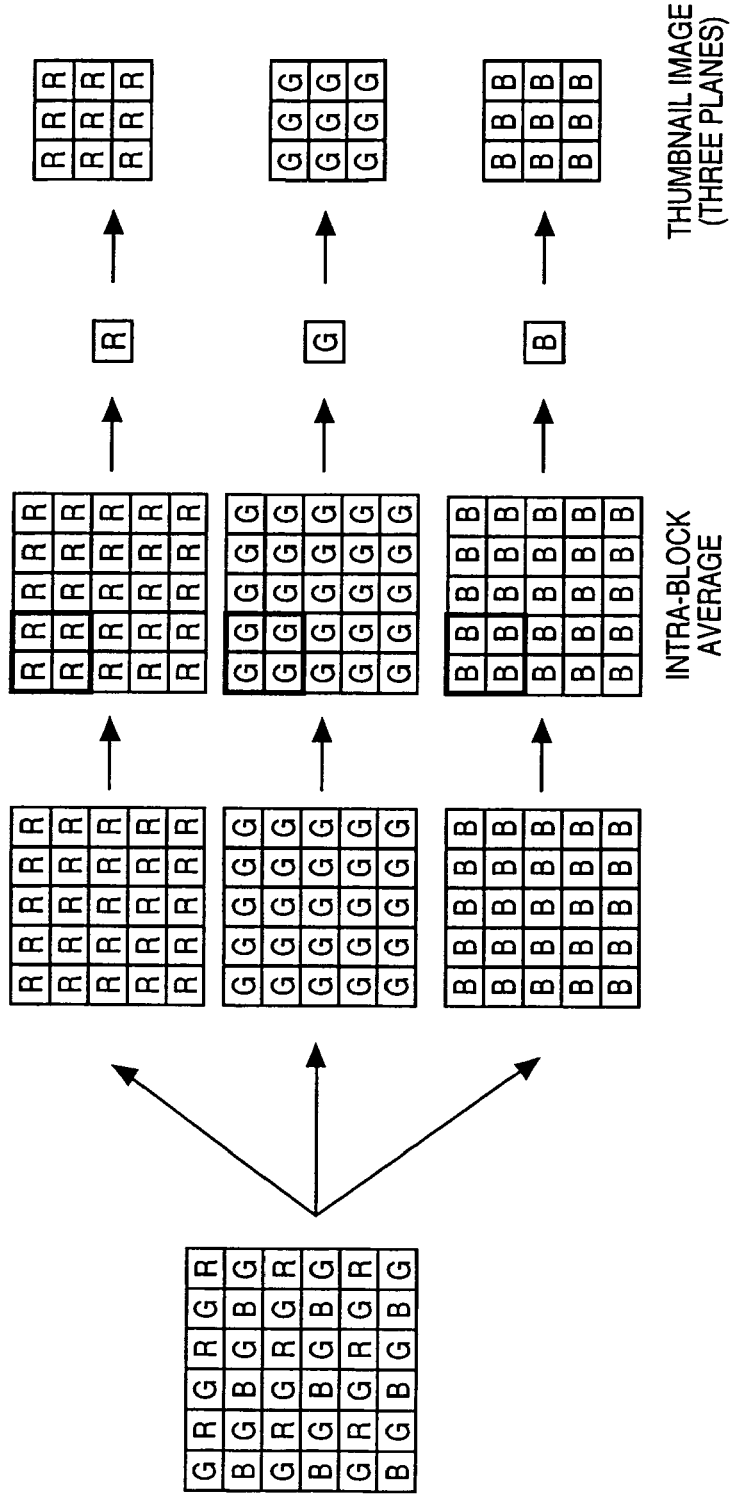

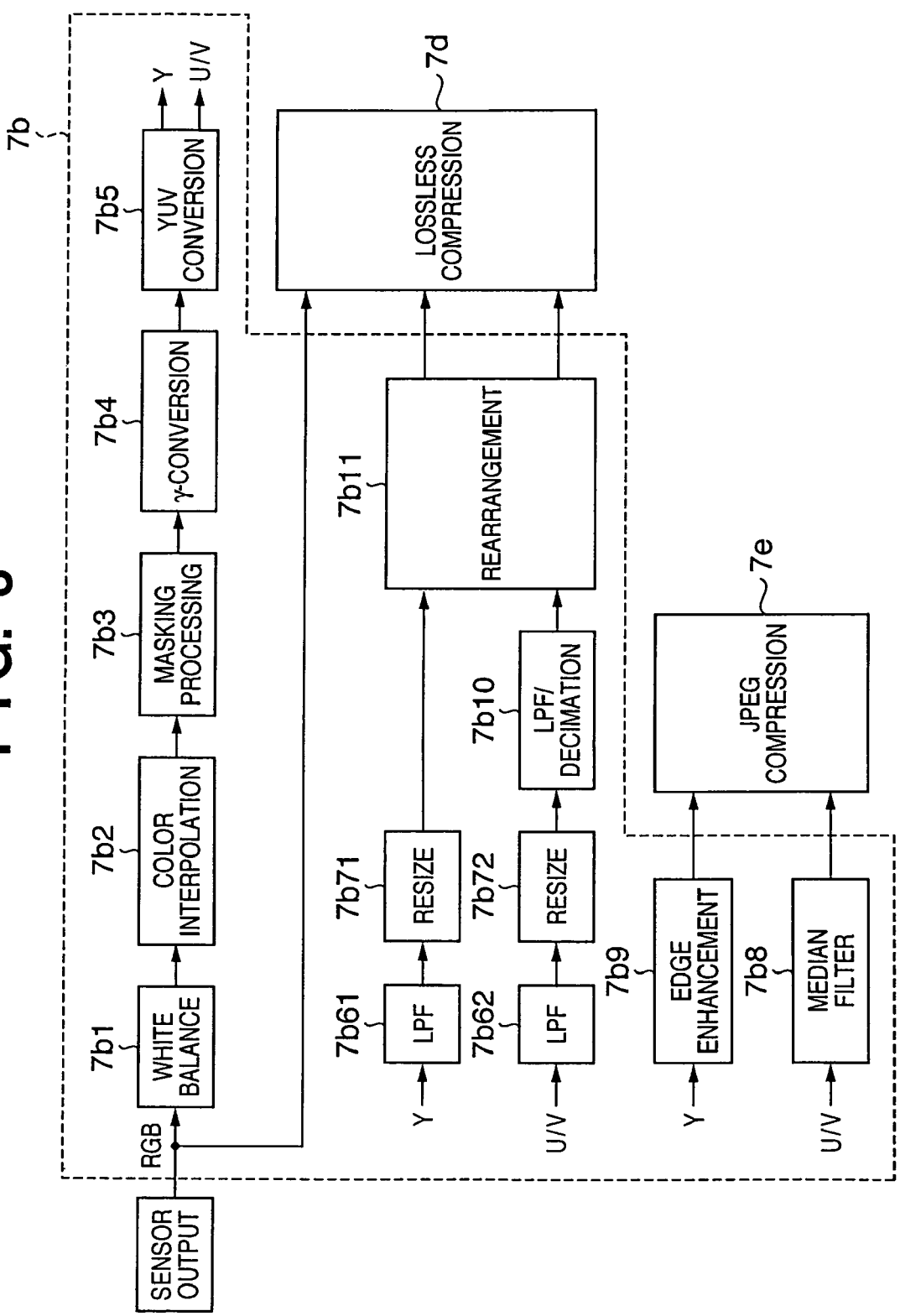

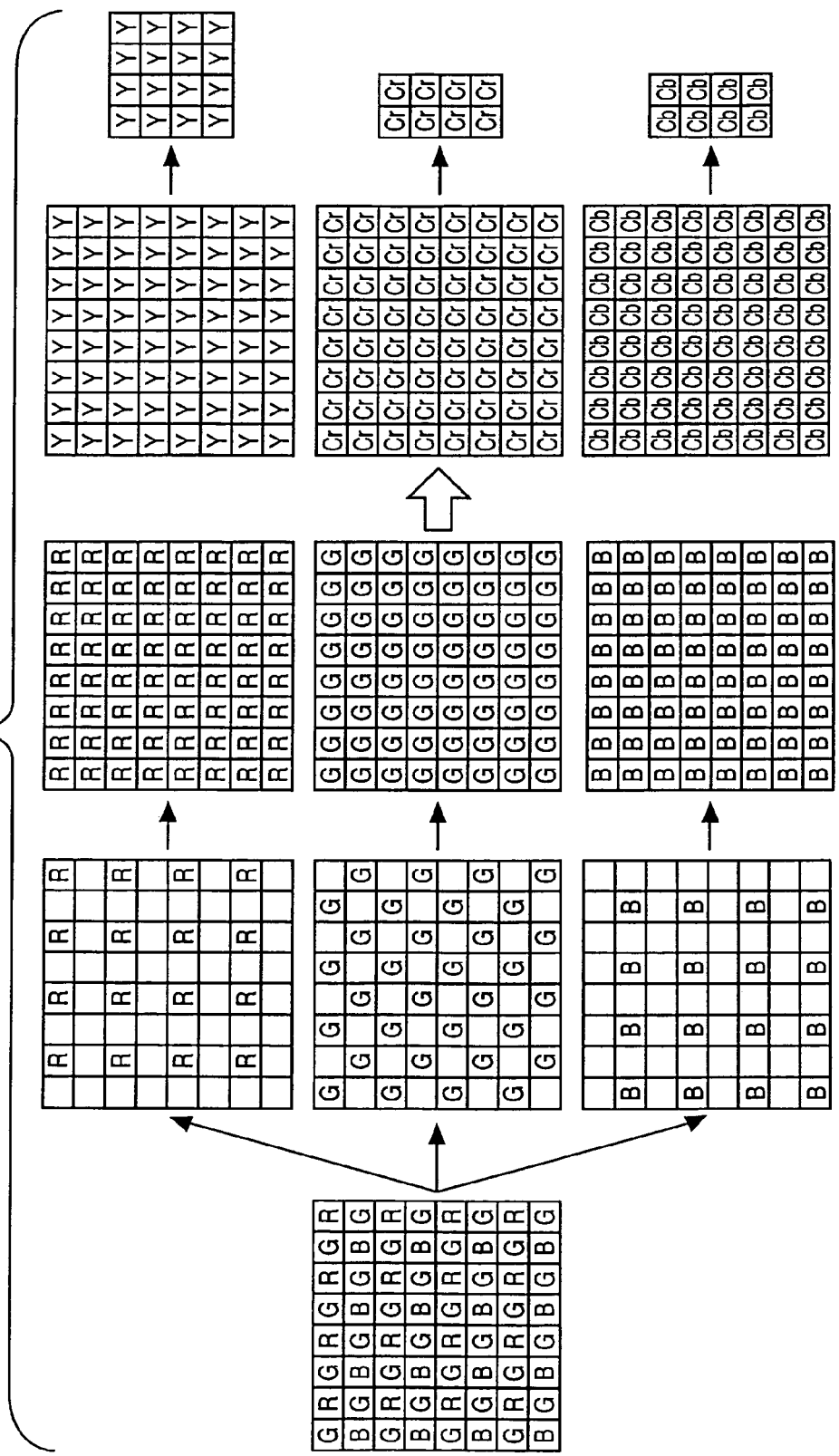

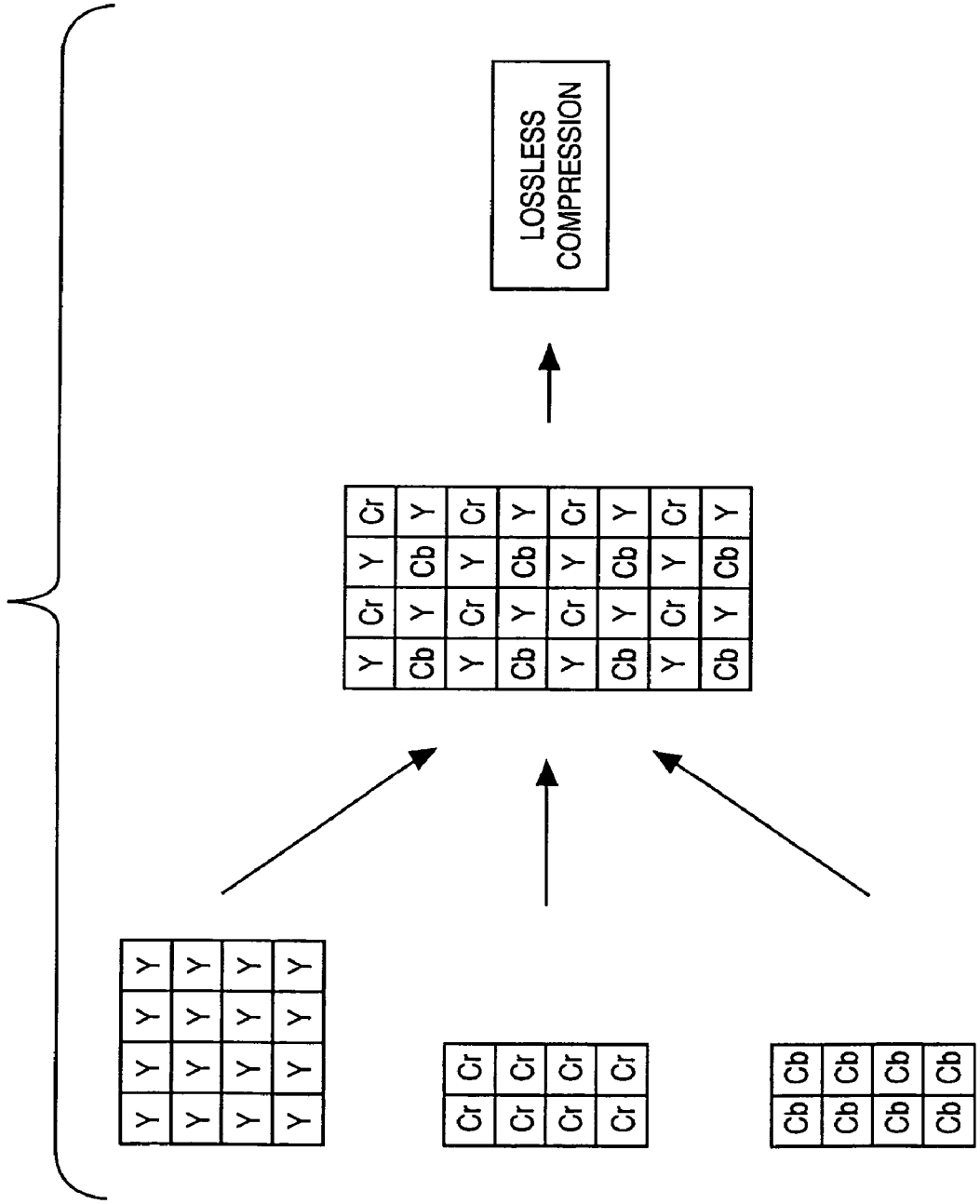

FIG. 6
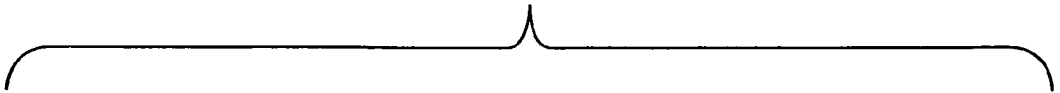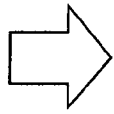

IMAGE CAPTURING APPARATUS, IMAGE PROCESSING METHOD, PROGRAM, AND STORAGE MEDIUM

BACKGROUND OF THE INVENTION

1. Field of the Invention

The present invention relates to a technique of resizing (resolution-converting) captured image data.

2. Description of the Related Art

As is well-known conventionally, a digital camera generates two kinds of files. One is the JPEG or TIFF file format used for an image that has undergone image processing in the digital camera. A general-purpose image viewer can open this image file. The other is a file format called RAW that records the output of a two-dimensional array sensor upon image capturing without executing any image processing related to image capturing conditions. As a characteristic feature, the RAW format can redevelop an image by changing various parameters at the time of image capturing because an application outside the camera executes image processing related to the image capturing conditions (e.g., Japanese Patent Laid-Open No. 2004-128809).

However, a RAW image file is losslessly compressed data and generally has a size larger than a JPEG or TIFF file. The RAW format is effective when JPEG compression is undesirable, or when the light source state is difficult to estimate and should be adjusted later.

Some conventional digital cameras generate both RAW image data and JPEG image data by one image capturing. FIG. 8 shows a block arrangement for generating RAW image data and JPEG image data.

A white balance circuit 7b1 adjusts the white balance of digital image data output from an image sensor and A/D-converted by multiplying the image data by a white balance coefficient. The image data with the adjusted white balance undergoes color interpolation by a color interpolation circuit 7b2 to generate three R, G, and B planes from the data of a pattern (e.g., Bayer matrix) with a matrix of R (red), G (green), and B (blue). A masking processing circuit 7b3 optimizes the colors of the image data containing the three R, G, and B planes by, e.g., a 3×3 matrix operation. A γ-conversion circuit 7b4 executes γ-conversion of the image data. A YUV conversion circuit 7b5 converts the γ-converted image data from R, G, and B signals to a luminance component Y and color difference components U/V for false color processing and edge enhancement.

To create a normal JPEG image, the Y signal, i.e., the luminance component of the YUV-converted signals undergoes edge enhancement by an edge enhancement circuit 7b9. The U/V signals, i.e., the color difference components of the YUV-converted signals pass through the median filter of a median filter circuit 7b8. A JPEG compression circuit 7e JPEG-compresses the resultant YUV data.

The digital image data also directly enters a lossless compression circuit 7d without passing through the white balance circuit and the like. The image processing circuit 7b creates RAW image data.

However, the RAW file always has a data size corresponding to the number of pixels of the sensor, as shown in FIG. 4. It is therefore not easy to reduce the file size in accordance with the application purpose of the image. If the number of pixels of a digital camera increases, the size of the RAW file also increases. However, most two-dimensional array sensors have a staggered RGB pattern called a Bayer matrix. Hence, it is impossible to simply reduce the number of pixels, unlike the data of three R, G, and B planes. If image data of the Bayer matrix is simply resized and returned to the original pattern, moiré and false colors after development increase as compared to the image data before resizing, resulting in degradation in image quality.

SUMMARY OF THE INVENTION

The present invention has been made in consideration of the above-described problem, and has as its object to reduce image quality degradation such as false colors and moiré in a resized image in obtaining the resized image.

In order to solve the above-described problem and achieve the object, according to the first aspect of the present invention, there is provided an image capturing apparatus comprising an image sensor which converts an optical image into an electrical signal, an A/D conversion unit which converts an image signal output from the image sensor into digital image data, a color interpolation unit which executes color interpolation of the digital image data, a separation unit which separates the digital image data that has undergone color interpolation by the color interpolation unit into luminance component data and color difference component data, an image size conversion unit which converts an image size of the luminance component data and color difference component data separated by the separation unit, and a compression unit which compresses the luminance component data and color difference component data generated by the image size conversion unit to generate compressed data.

According to the second aspect of the present invention, there is provided an image processing method comprising an A/D conversion step of converting, into digital image data, an image signal output from an image sensor that converts an optical image into an electrical signal, a color interpolation step of executing color interpolation of the digital image data, a separation step of separating the digital image data that has undergone color interpolation in the color interpolation step into luminance component data and color difference component data, an image size conversion step of converting an image size of the luminance component data and color difference component data separated in the separation step, and a compression step of compressing the luminance component data and color difference component data generated in the image size conversion step.

According to the third aspect of the present invention, there is provided a program causing a computer to execute the above image processing method.

According to the fourth aspect of the present invention, there is provided a storage medium storing the above program.

Further features of the present invention will become apparent from the following description of exemplary embodiments (with reference to the attached drawings).

BRIEF DESCRIPTION OF THE DRAWINGS

FIG. 2A is a view showing data processing according to the first embodiment of the present invention;

FIG. 3 is a block diagram showing the detailed arrangement of an image processing unit according to the first embodiment of the present invention;

FIG. 4 is a view showing data processing according to the first embodiment of the present invention;

FIG. 5 is a view showing data processing according to the first embodiment of the present invention;

FIG. 6 is a view showing data processing according to the first embodiment of the present invention;

DESCRIPTION OF THE EMBODIMENTS

Preferred embodiments of the present invention will be described below in detail with reference to the accompanying drawings.

First Embodiment

Figure 1:
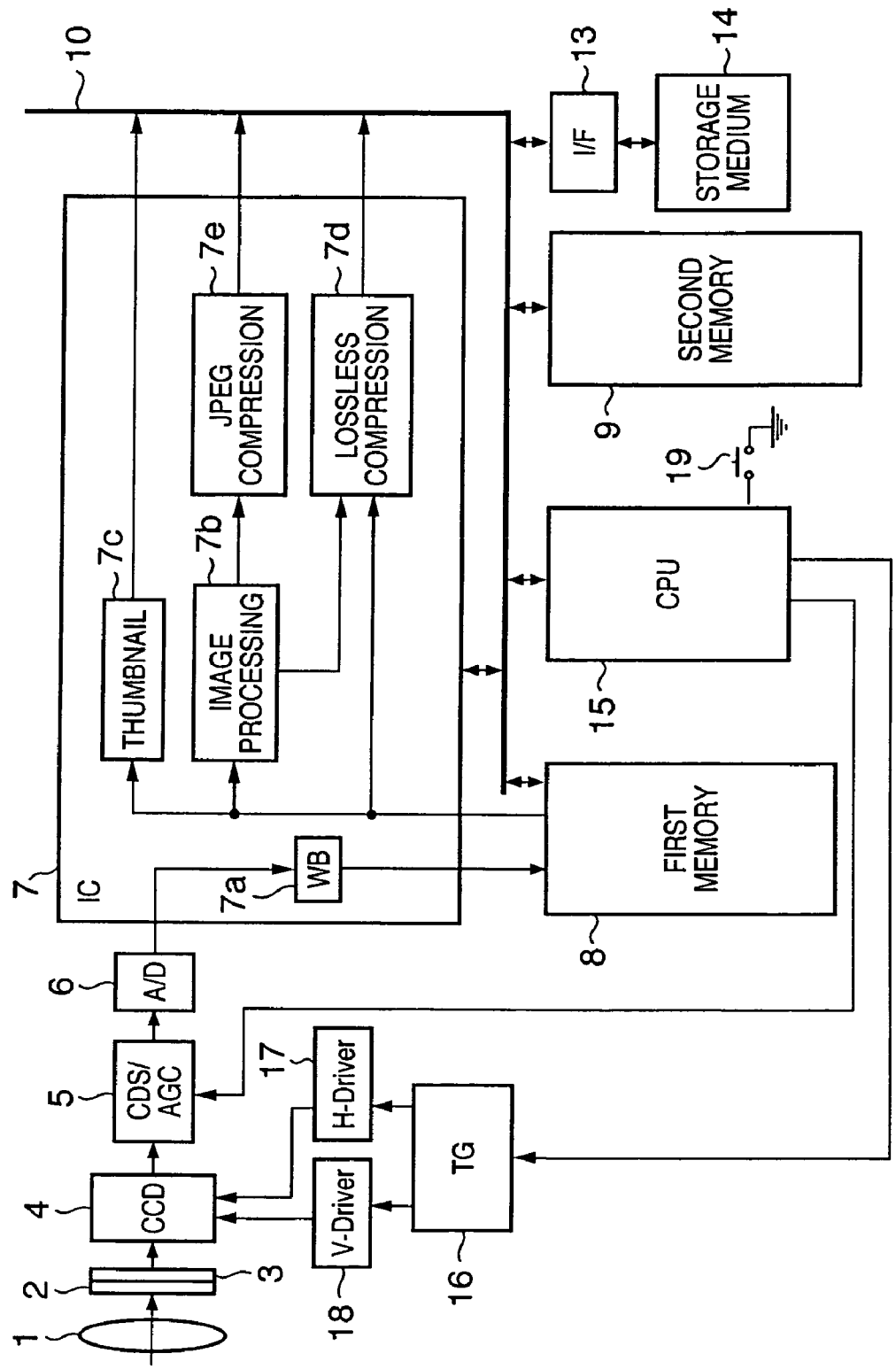
FIG. 1 is a block diagram showing the arrangement of a digital camera according to the first embodiment of the present invention.

FIG. 1 is a block diagram showing the arrangement of a digital camera according to the first embodiment of the present invention.

Light passing through a photographing lens 1 passes through an infrared cut filter 2 and an optical LPF (low-pass filter) 3 and forms an image on an image sensor 4 (to be referred to as a CCD hereinafter).

Photo-electric conversion sensors using photodiodes are two-dimensionally arranged on the light-receiving surface of the CCD 4. Each sensor has primary color filters of one color, e.g., R (red), G (green), or B (blue), which are arrayed in a predetermined pattern. In this embodiment, the color filters separate light into three color components, i.e., R, G, and B components. Alternatively, each of a plurality of (e.g., three) image sensors may be assigned one color.

Each senor converts the light that has formed an image on the CCD 4 into charges in an amount corresponding to the quantity of incident light.

A timing generator 16 generates a signal and supplies it to a horizontal driving driver 17 and a vertical driving driver 18. The horizontal driving driver 17 and vertical driving driver 18 drive the CCD 4 to transfer the charges stored in the sensors. The charges are sequentially converted into a voltage signal and output from the CCD 4.

A correlated double sampling circuit 5 (to be referred to as a CDS hereinafter) samples the voltage signal output from the CCD 4. An A/D converter 6 converts the signal into a digital signal.

The image data converted into the digital signal enters an image processing IC 7. The image data first enters a WB (White Balance) circuit 7a that calculates data for white balance adjustment. A first memory 8 temporarily stores the image data output from the WB circuit 7a.

The data stored in the first memory 8 is input to the image processing IC 7 again and subjected to three kinds of image processing.

A lossless compression circuit 7d receives the image data converted into the digital signal and directly losslessly compresses it. The lossless compression circuit 7d sends the losslessly compressed RAW data to a CPU bus 10.

A RAW thumbnail circuit 7c also receives the image data converted into the digital signal. The RAW thumbnail circuit 7c generates thumbnail image data smaller than the original image by intra-block averaging the RAW data and downsampling the data by decimation, as shown in FIG. 2A. The RAW thumbnail circuit 7c outputs the thumbnail image data to the CPU bus 10.

Figure 2B:
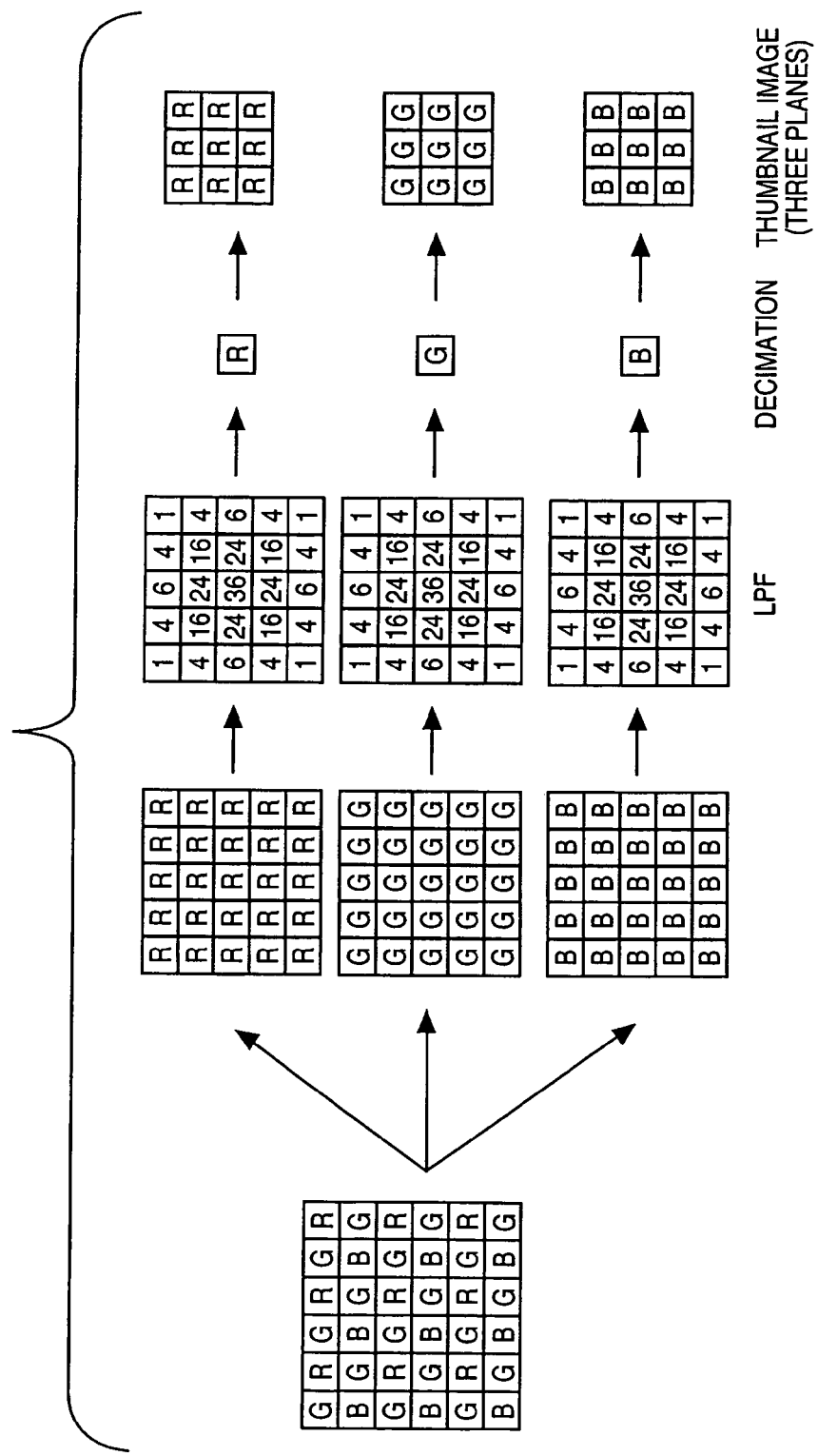
FIG. 2B is a view showing data processing according to the first embodiment of the present invention.

Another RAW data generation method shown in FIG. 2B is also usable. This method generates thumbnail image data smaller than the original image by making the RAW data pass through an LPF (low-pass filter) and then decimating the data.

If thumbnail image data is generated by decimating RAW data without lossy compression, a thumbnail image displayed on the liquid crystal display unit of a camera or a PC (Personal Computer) can also have a high image quality.

An image processing circuit 7b also receives the image data converted into the digital signal. The image processing circuit 7b converts the RGB image data into Y/Cb/Cr signals and executes raster block conversion of the data. A JPEG compression circuit 7e JPEG-compresses the image data. The JPEG compression circuit 7e outputs the JPEG image data to the CPU bus 10.

In addition, the image processing circuit 7b sends image data resized by using some of its functions to the lossless compression circuit 7d. The lossless compression circuit 7d sends its output to the CPU bus 10 as resized RAW data (Small RAW data).

Image processing executed by the image processing circuit 7b will be described in more detail.

FIG. 3 is a block diagram showing the outline of image processing by the image processing circuit 7b.

The digital image data input from the first memory 8 enters a white balance circuit 7b1. The white balance circuit 7b1 multiplies the image data by a white balance coefficient which is calculated by a CPU 15 on the basis of data calculated by the WB circuit 7a in advance. Alternatively, the white balance circuit 7b1 multiplies the image data by a preset coefficient of white balance (e.g., daylight, tungsten light, or fluorescent light).

The image data with the white balance adjusted by the white balance circuit 7b1 undergoes color interpolation by a color interpolation circuit 7b2 to generate three R, G, and B planes from the data of a pattern (e.g., Bayer matrix) with an RGB matrix, as shown in FIG. 4.

A masking processing circuit 7b3 optimizes the colors of the image data containing the three R, G, and B planes by, e.g., a 3×3 matrix operation given by $$R' = m11 \times R + m12 \times G + m13 \times B$$

$$G' = m21 \times R + m22 \times G + m23 \times B$$

$$B' = m31 \times R + m32 \times G + m33 \times B \quad (1)$$

A γ-conversion circuit 7b4 executes γ-conversion of the image data.

The γ-converted image data is converted from R, G, and B signals to a luminance component Y and color difference components U/V for false color processing and edge enhancement.

To create a normal JPEG image, the luminance component Y of the YUV-converted signals undergoes edge enhancement by an edge enhancement circuit 7b9. The color difference components U/V of the YUV-converted signals pass through the median filter of a median filter circuit 7b8. The JPEG compression circuit 7e JPEG-compresses the resultant YUV data.

The resized RAW data (Small RAW data) is generated in the following way.

The digital image data input from the first memory 8 passes through the white balance circuit 7b1 without any processing (or is multiplied by a predetermined coefficient) and undergoes color interpolation by the color interpolation circuit 7b2. The image data passes through the masking processing circuit 7b3 and γ-conversion circuit 7b4 without any processing. A YUV conversion circuit 7b5 converts the data from R, G, and B signals to Y, U, and V signals. The luminance signal Y and color difference signals U/V output from the YUV conversion circuit 7b5 pass through the two-dimensional LPFs of LPF (low-pass filter) circuits 7b61 and 7b62 and undergo resolution conversion by resizing circuits 7b71 and 7b72.

An LPF/decimation processing circuit 7b10 further decimates, through an LPF, the UV data that has undergone resolution conversion. A rearrangement circuit 7b11 adjusts the timings of the luminance signal Y and decimated color difference signals U/V to rearrange the data to, e.g., a Bayer matrix shown in FIG. 5, like general RAW data. The data is sent to the lossless compression circuit 7d and losslessly compressed. Finally, the input digital image data with the RGB Bayer matrix is rearranged to the resolution-converted Y/Cb/Cr Bayer matrix and losslessly compressed, as shown in FIG. 6. This data rearranged to the resolution-converted (resized) Y/Cb/Cr Bayer matrix and losslessly compressed will be referred to as Small RAW data.

The Small RAW data is resized by executing color interpolation of Bayer matrix data to generate three R, G, and B planes, converting the data to luminance/color difference components (Y, Cr, and Cb) and making the signals pass through an LPF. After that, the data is rearranged to the Bayer matrix while maintaining the information of the luminance component by decimating only the color difference components. This allows to generate Small RAW data that keeps the resolution while reducing false colors and moiré.

A second memory 9 stores the JPEG data, losslessly compressed data (RAW data), Small RAW data, and RAW thumbnail data sent to the CPU bus 10. The data are converted into corresponding file formats.

The JPEG data, losslessly compressed data (RAW data), Small RAW data, and RAW thumbnail data are sent to an I/F circuit 13 and stored in a detachable storage medium 14 such as a Compact Flash®.

The series of operations are executed when a release switch 19 of the CPU 15 is pressed once, i.e., at the time of image capturing.

As described above, in this embodiment, the image capturing apparatus generates Small RAW data and RAW thumbnail data in addition to JPEG image data and RAW data.

The Small RAW data is image data that is reduced (resized) while suppressing degradation in image quality and is therefore effective when, e.g., the user checks the image processing result by changing image processing parameters in the image capturing apparatus. That is, since the image data has a small size and minimizes degradation in image quality, the effect of changes of image processing parameters can more clearly be reproduced on the screen of, e.g., the liquid crystal display device of the image capturing apparatus. This also applies to observation on the screen of a PC. When the image capturing apparatus side prepares in advance image data reduced with minimum degradation in image quality, the user can easily grasp, on the PC, the effect of processes with changes of image processing parameters.

In addition, generating RAW thumbnail data reduced with minimum degradation in image quality allows to improve even the image quality of an image to be displayed as a thumbnail.

Second Embodiment

Figure 7:
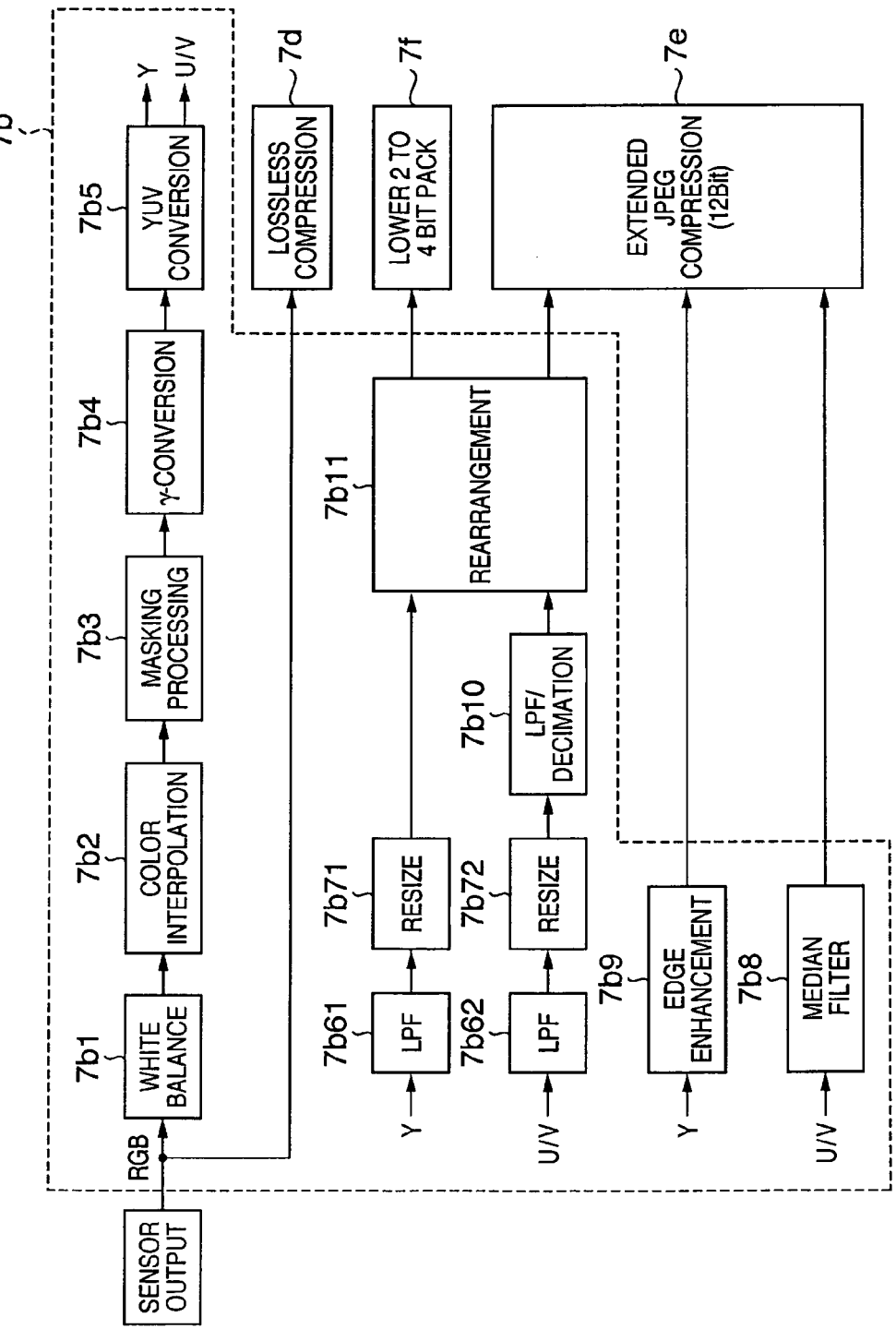
FIG. 7 is a block diagram showing the detailed arrangement of an image processing unit according to the second embodiment of the present invention.
Figure 8:
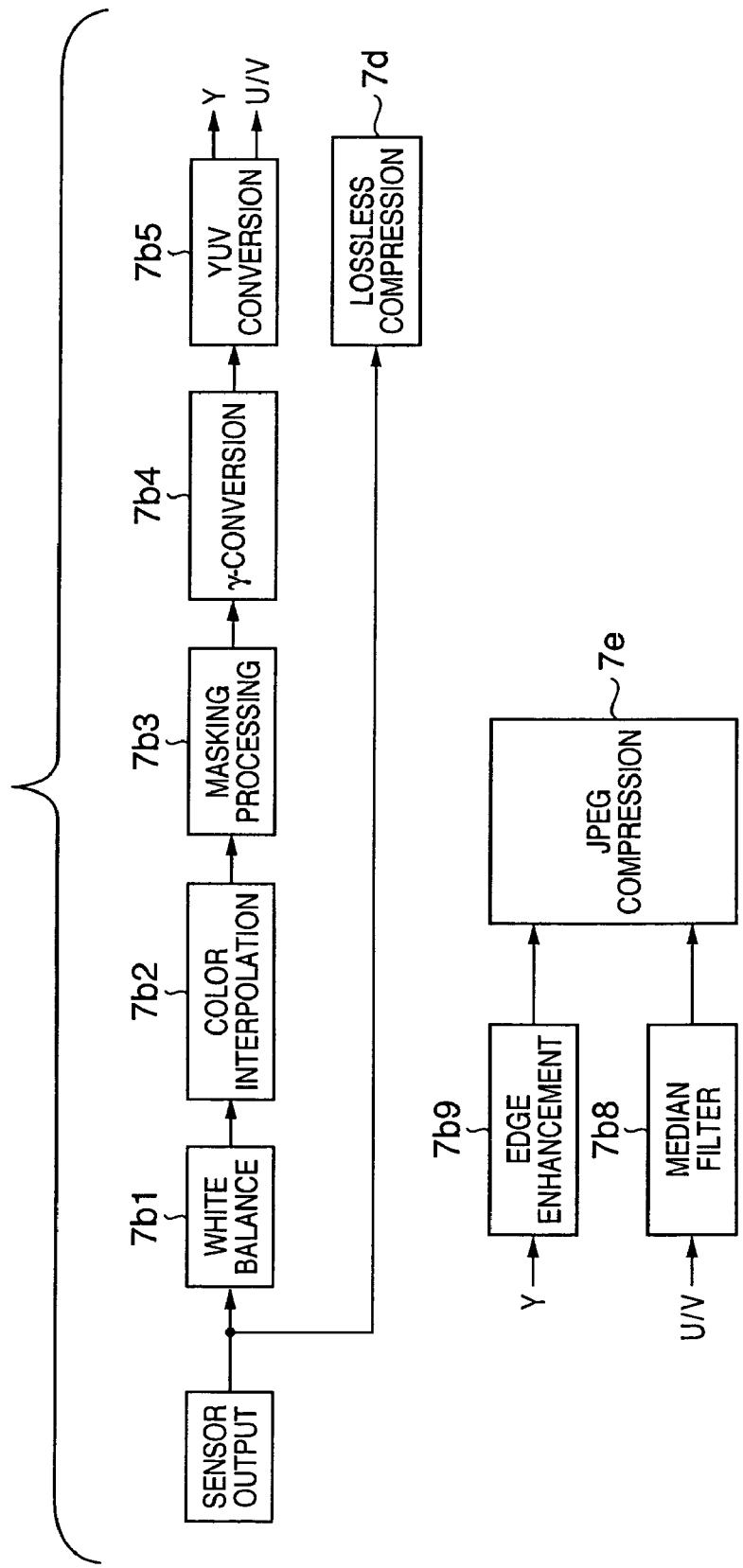
FIG. 8 is a block diagram showing the arrangement of a conventional image processing unit.

FIG. 7 is a block diagram showing the arrangement of a digital camera according to the second embodiment of the present invention.

In the second embodiment, the arrangement to form a normal JPEG image is the same as in the first embodiment, though the arrangement to generate Small RAW data is different. The second embodiment generates Small RAW data by extended JPEG based on the large number of bits without particular adherence to lossless compression.

Digital image data input from a first memory 8 passes through a white balance circuit 7b1 without any processing (or is multiplied by a predetermined coefficient) and undergoes color interpolation by the color interpolation circuit 7b2. The image data passes through a masking processing circuit 7b3 and a γ-conversion circuit 7b4 without any processing. A YUV conversion circuit 7b5 converts the data from R, G, and B signals to Y, U, and V signals. The luminance signal Y and color difference signals U/V output from the YUV conversion circuit 7b5 pass through the two-dimensional LPFs of LPF (low-pass filter) circuits 7b61 and 7b62 and undergo resolution conversion by resizing circuits 7b71 and 7b72.

An LPF/decimation processing circuit 7b10 further decimates, through an LPF, the UV data that has undergone resolution conversion. A rearrangement circuit 7b11 adjusts the timings of the luminance signal Y and decimated color difference signals U/V to rearrange, e.g., the upper 12 bits to the pattern 4:2:2 of general JPEG. The data is sent to an extended JPEG compression circuit 7e and JPEG-compressed. If the number of bits of digital data exceeds 12, a lower bit pack 7f collects and packs the lower bits (e.g., lower two bits of 14-bit data). These bits are stored independently of the JPEG data.

Executing the above-described operation for the entire image allows to create Small RAW data.

In the above-described embodiments, RAW data is obtained by A/D-converting a signal output from an image sensor and losslessly compressing the A/D-converted data. However, the image data need not always be compressed.

RAW data may be an analog signal output from an image sensor or an image signal that has undergone A/D conversion but not at least white balance processing yet. Alternatively, RAW data may be an image signal obtained from an image sensor that has undergone A/D conversion but not yet color separation processing of separating the image signal into a luminance signal and color difference signals. RAW data may also be an output signal from a color filter with a Bayer matrix, which has not undergone color interpolation processing yet. That is, RAW data can be any data capable of holding a signal output from an image sensor without loss in reproduction.

Without saving original RAW data, only Small RAW data created from it may be saved. The data amount of Small RAW data is smaller than that of original RAW data so that it is possible to record many images while saving the capacity of a recording medium. This shortens the image recording time upon image capturing and increases the number of continuously recordable images of the camera.

It is also possible to save original RAW data and Small RAW data in association with each other. Although the recording capacity increases, resize processing in the PC can be omitted by holding the size of Small RAW data smaller than the original RAW data, resulting in improvement of convenience.

According to the above-described embodiments, the number of pixels decreases so that false colors and moiré are prevented.

A RAW thumbnail image can reproduce an image processing result without any degradation in image quality and loss of data, as compared to a JPEG-compressed image arbitrarily processed by the user. A RAW thumbnail image obtained by reducing the original RAW image has a data amount smaller than that of the original RAW image and requires a shorter time for image processing. The RAW thumbnail image can therefore quickly display a result that reflects image processing parameters arbitrarily set by the user.

Other Embodiment

The object of the embodiments are also achieved by the following method. A storage medium (or recording medium) which records software program codes to implement the functions of the above-described embodiments is supplied to a system or apparatus. The computer (or CPU or MPU) of the system or apparatus reads out and executes the program codes stored in the storage medium. In this case, the program codes read out from the storage medium themselves implement the functions of the above-described embodiments. The storage medium that stores the program codes constitutes the present invention. The functions of the above-described embodiments are implemented not only by causing the computer to execute the readout program codes. The present invention also incorporates the following arrangement. The operating system (OS) running on the computer wholly or partially executes actual processing on the basis of the instructions of the program codes, thereby implementing the functions of the above-described embodiments.

The present invention also incorporates the following arrangement. The program codes read out from the storage medium are written in the memory of a function expansion card inserted to the computer or a function expansion unit connected to the computer. The CPU of the function expansion card or function expansion unit wholly or partially executes actual processing on the basis of the instructions of the program codes, thereby implementing the functions of the above-described embodiments.

The storage medium to which the present invention is applied stores program codes corresponding to the above-described procedures.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2005-347931, filed Dec. 1, 2005, which is hereby incorporated by reference herein in its entirety.

What is claimed is:

1. An image capturing apparatus comprising:
   an image sensor which converts an optical image into an electrical signal;
   an A/D conversion unit which converts an image signal output from said image sensor into digital image data;
   a color interpolation unit which executes color interpolation of the digital image data;
   a separation unit which separates the digital image data that has undergone color interpolation by said color interpolation unit into luminance component data and color difference component data;
   an image size conversion unit which converts an image size of the luminance component data and color difference component data separated by said separation unit by undergoing resolution conversion of each component data; and
   a compression unit which compresses the luminance component data and color difference component data generated by said image size conversion unit to generate compressed data.

2. The apparatus according to claim 1, wherein said compression unit executes lossless compression.

3. The apparatus according to claim 1, further comprising a decimation unit which decimates not the luminance component data but the color difference component data.

4. The apparatus according to claim 3, wherein the luminance component data and color difference component data contain Y, Cb, and Cr signals.

5. The apparatus according to claim 3, wherein said compression unit generates extended JPEG-compressed data by lossy-compressing the luminance component data generated by said image size conversion unit and the color difference component data decimated by said decimation unit.

6. The apparatus according to claim 5, wherein when the number of bits of the luminance component data and color difference component data generated by said image size conversion unit is larger than 12, upper 12 bits are compressed by extended JPEG, and lower two bits of data of all pixels are stored collectively.

7. The apparatus according to claim 3, further comprising a rearrangement unit which rearranges the data to an RGB Bayer matrix by adjusting timings of the luminance component data generated by said image size conversion unit and the color difference component data decimated by said decimation unit.

8. The apparatus according to claim 1, further comprising:
   an image processing unit which executes image processing of the luminance component data and color difference component data separated by said separation unit;
   a JPEG compression unit which generates JPEG-compressed image data by executing lossy JPEG compression for the luminance component data and color difference component data processed by said image processing unit; and
   a storage unit which stores, in a storage medium, the compressed data generated by said compression unit and the JPEG-compressed image data generated by said JPEG compression unit.

9. An image processing method comprising:
   an A/D conversion step of converting, into digital image data, an image signal output from an image sensor that converts an optical image into an electrical signal;
   a color interpolation step of executing color interpolation of the digital image data;
   a separation step of separating the digital image data that has undergone color interpolation in the color interpolation step into luminance component data and color difference component data;
   an image size conversion step of converting an image size of the luminance component data and color difference component data separated in the separation step by undergoing resolution conversion of each component data; and
   a compression step of compressing the luminance component data and color difference component data generated in the image size conversion step.

10. A computer-readable storage medium storing a computer-executable program causing a computer to execute an image processing method of claim 9.

* * * * *